United States Patent

[11] 3,601,675

| [72] | Inventor | Carl Radtke |
| | | Chicago, Ill. |
| [21] | Appl. No. | 53,551 |
| [22] | Filed | July 9, 1970 |
| [45] | Patented | Aug. 24, 1971 |
| [73] | Assignee | Ickes-Braun Glasshouses, Inc. |
| | | Deerfield, Ill. |

[54] VENTILATOR CONTROLLER FOR A GREENHOUSE
3 Claims, 1 Drawing Fig.

[52] U.S. Cl. .................................... 318/471,
318/207, 318/221, 318/284, 318/486
[51] Int. Cl. ........................................ G05b 7/00
[50] Field of Search .......................... 318/472,
471, 207, 221 F, 284, 486

[56] References Cited
UNITED STATES PATENTS
| 2,406,430 | 8/1946 | Mason ........................ | 318/221 |
| 2,598,440 | 5/1952 | Reek .......................... | 318/221 |
| 2,683,844 | 7/1954 | Schaefer ...................... | 318/221 |

*Primary Examiner*—Benjamin Dobeck
*Attorney*—Anderson, Luedeka, Fitch, Even & Tabin ABSTRACT: A controller for opening and closing a ventilator for a greenhouse in response to temperature sensed by a thermostat within the greenhouse. The ventilator is opened and closed by a single-phase capacitor start motor having a centrifugal switch connected in series with its starting winding. The motor is controlled by a reversing relay which is coupled to the motor so as to cause the motor to drive in a direction to open the ventilator when an open-relay coil in the relay is energized and to cause the motor to drive in a direction to close the ventilator when a close-relay coil within the relay is energized. A delay system is provided to prevent the motor from being energized to reverse its direction of rotation for a time period sufficient to enable the centrifugal switch to close. The delay system is arranged so that when the thermostat first calls for a reversal of the drive motor it actuates a delay motor. The delay motor drives a cam which, after a delay sufficient to enable the centrifugal switch to drop out actuates a switch means to disconnect the delay motor and to energize the close (or open) relay, thus energizing the drive motor.

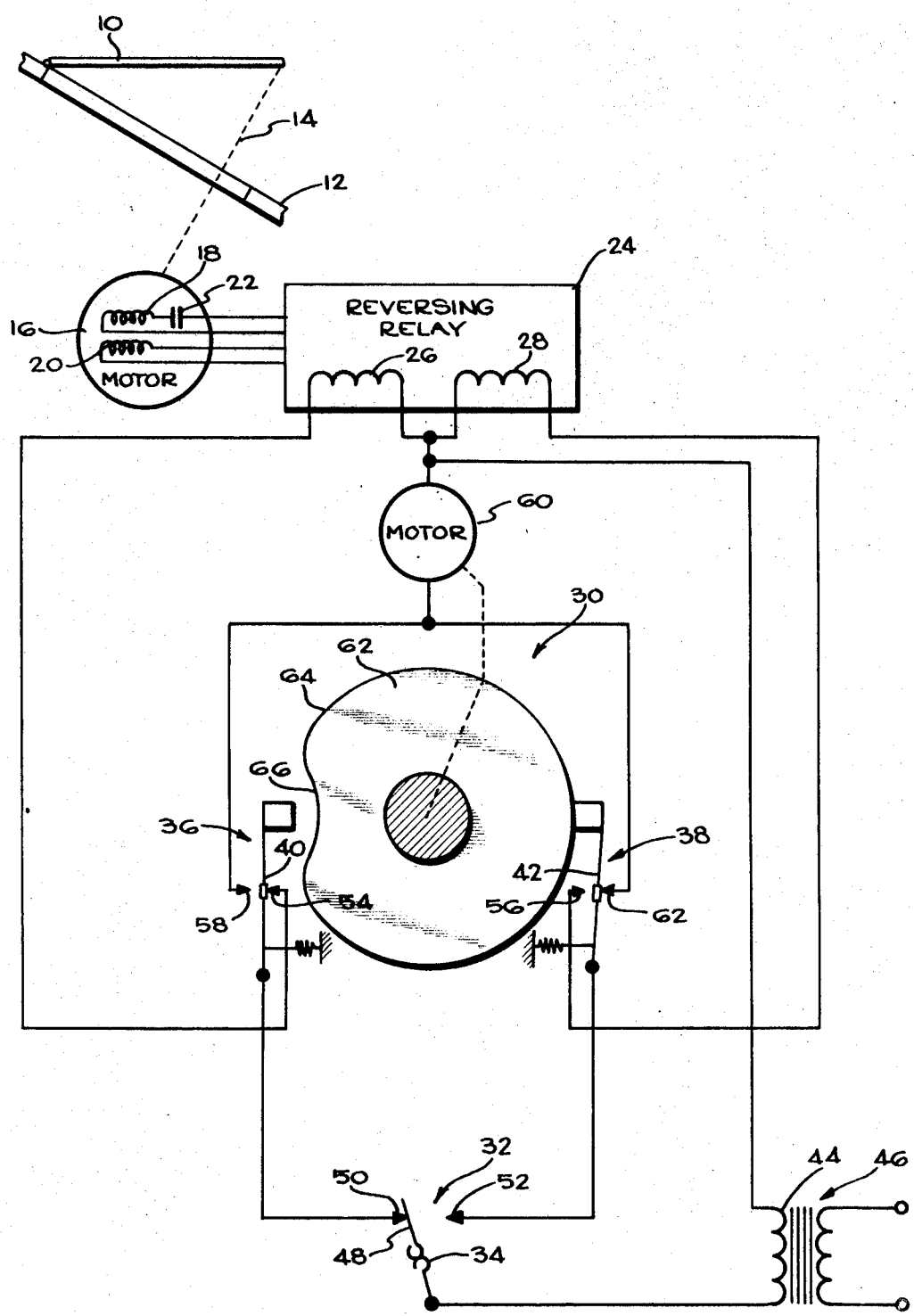

VENTILATOR CONTROLLER FOR A GREENHOUSE

The present invention relates to a controller for opening and closing a ventilator in a greenhouse.

One way in which the temperature within a greenhouse has been controlled is by means of opening and closing ventilators in the roof or sidewalls of the greenhouse. Normally the ventilators are opened when the temperature within the greenhouse exceeds a temperature setting and are closed when the temperature within the greenhouse decreases below the temperature setting.

In one previously available controller, a single-phase capacitor start induction motor was employed to drive the mechanism for positioning the ventilator. The phase of the current in the starting winding of the motor is reversed to change the direction of rotation of the motor and hence the direction in which the positioning mechanism is driven. The energization of the running and starting windings of the motor is controlled by a reversing relay which, in turn, is controlled by a single-pole, double-throw, quick-acting thermostat. Limit switches are provided to limit the travel of the positioning mechanism to the full open and to the full close position or, if desired, limit switches may be inserted into the circuit to deenergize the motor at a quarter-open position, or a half-open position. Also, in the controller, an overriding circuit is provided which is actuated by a wind and rain control to close the ventilator when either the wind exceeds a predetermined velocity or when the rain is sensed. Also manual operation controls are provided.

Because the thermostat is quick acting and has no neutral position, there is a possibility that the thermostat will call for a reversal of the drive motor while the motor is driving in the other direction. In such a situation, if precautions are not taken, the voltage applied to the motor windings will be reversed, but since the centrifugal switch in the motor has not had time to drop out or close, the motor will not reverse but will continue to rotate in the same direction. In the prior art controller to ensure that the centrifugal switch had sufficient time to drop out, thermal time delays have been provided. These thermal time delays have been unreliable and also required a considerable amount of assembly time.

An object of the present invention is the provision of an improved controller for opening and closing a ventilator for a greenhouse.

Another object is the provision of a controller for opening and closing a ventilator for a greenhouse which is provided with an improved time delay circuit to eliminate the possibility of motor reversing failure.

Still another object is the provision of a controller for opening and closing a ventilator for a greenhouse which is provided with an improved time delay circuit which is reliable and requires relatively little assembly time.

Other objects and advantages of the present invention will become apparent by reference to the following description and accompanying drawing wherein the single FIG. shows a schematic circuit diagram of a controller constructed in accordance with the present invention.

Briefly, in accordance with the present invention, a controller is provided for opening and closing a ventilator for a greenhouse in response to the temperature sensed by a thermostat within the greenhouse. The ventilator is opened and closed by a single-phase capacitor start motor having a centrifugal switch connected in series with its starting winding. The motor is controlled by a reversing relay which is coupled to the motor so as to cause the motor to drive in a direction to open the ventilator when an open-relay coil in the relay is energized and to cause the motor to drive in a direction to close the ventilator when a close-relay coil within the relay is energized. A delay system is provided to prevent the motor from being energized to reverse its direction of rotation for a time period sufficient to enable the centrifugal switch to close. The delay system is arranged so that when the thermostat first calls for a reversal of the drive motor it actuates a delay motor. The delay motor drives a cam which, after a delay sufficient to enable the centrifugal switch to drop out actuates a switch means to disconnect the delay motor and to energize the close (or open) relay, thus energizing the drive motor.

More particularly, the illustrated controller is employed for opening and closing a ventilator 10 in a greenhouse. The ventilator may include a section of glass in the roof 12 or side of the greenhouse which section is pivotally mounted at one side thereof. The ventilator 10 is pivoted by a positioning mechanism 14 which is connected to a drive motor 16 which is a single-phase, capacitor start motor having a starting winding 18 and a running winding 20. Connected in series with the starting winding 18 is a centrifugal switch 22 which opens to deenergize the starting winding when the motor attains a predetermined speed.

The drive motor 16 is connected to a reversing relay circuit 24 which includes an open relay 26 and a close relay 28. The contacts (not shown) of the open and close relays 26 and 28 are arranged so as to connect the starting and running windings 18 and 20 to a source of alternating current power when the open relay 26 is energized and to connect the starting and running windings with an opposite phase relationship when the close relay is energized. As is well known, the direction of rotation of the capacitor start motor 16 depends upon the relationship between the phase of the starting winding 18 and phase of the running winding 20. If the phase on the running winding is reversed while the motor is running, (viz, while the starting winding is disconnected by the centrifugal switch), the motor will continue to rotate in the same direction. Therefore, delay means 30 is provided to enable the centrifugal switch 22 to be dropped out or closed before the open or close relay 26, 28 is energized by a thermostat 32. The thermostat 32, in the illustrated embodiment, includes a single-pole, double-throw switch which is activated by, for example, a bimetallic element 34.

In the illustrated embodiment the delay means 30 provides a predetermined delay after the thermostat 32 switches and then permits the thermostat to energize the close or open relay 26, 28, as the case may be. The delay means 30 includes a first and second switch means 36 and 38, each of which is a single-pole, double-throw switch, so as to provide a normally open contact and a normally closed contact. The right or normally closed fixed contact 40 of the first switch means 36 is connected to one side of the open relay coil 26, and the left or normally closed fixed contact 42 of the second switch means 38 is connected to one side of the close relay coil 28. The other sides of the relay coils 26 and 28 are connected to one side of the secondary winding 44 of a low voltage transformer 46. The other side of the secondary winding 44 is connected to the movable contact 48 of the thermostat 32, which moves to the left in the drawing and contacts the left fixed contact 50 when the temperature is above a desired setting and moves to the right and contacts the right fixed contact 52 when the temperature is below the desired setting. The left fixed contact 50 of the thermostat 32 is connected to the movable contact 54 of the first switch means 36 and the right fixed contact 52 of the thermostat 32 is connected to the movable contact 56 of the second switch means 38.

The normally open fixed contact 58 of the first switch means 36 is connected to one or lower side of a delay motor 60. The other side of the delay motor 60 is connected to the upper terminal of the secondary winding 44 of the transformer 46. The normally open fixed contact 62 of the second switch means 38 is also connected to the lower side of the delay motor 60. The delay motor is a single-phase motor which is geared down so that its output shaft rotates at a slow speed, such as 6 r.p.m.

The output shaft of the delay motor 60 is connected to a cam 62 which is a circular plate 64 having a groove 66 therein. The movable contacts of the first and second switch means 36 and 38 are structured to ride on the plate 64 at about diametrically opposed points. Thus, the cam 62 maintains the first and second switch means 36 and 38 in their operated positions for about two-thirds of a revolution of the cam 62 and sequentially allows the switch means to return to their normal positions for one-third of a revolution of the cam. Instead of a single cam, two separate cams may be connected to the motor shaft, one for switch means 36 and one for switch means 38.

In operation, assuming that the ventilator 10 is in its open position and the temperature in the greenhouse is above the temperature setting, the thermostat 32 is in its left hand or open position. In this position the cam 62 is in a position such that the first switch means 36 is in its normal position and the second switch means 38 is in its operated position. Thus the open relay coil 26 is energized and the delay motor 60 is deenergized. Assume that the temperature in the greenhouse falls below the temperature setting and causes the thermostat 32 to switch position. Since the second switch means 62 is in its operated position, the switching of the thermostat actuates the delay motor 60 through the normally open contact 62 of the switch means 38. The actuation of the delay motor 60 causes the cam 62 to rotate and, after a predetermined delay, it permits the second switch means 38 to return to its normal position and causes the first switch means 36 to switch to its operated position. At this time electrical energy is supplied through the normally closed contact 42 of the second switch means 38 to the close relay coil 28, thereby energizing the rivet motor 16 to close the ventilator 10. The switching of the second switch mean 38 also deenergizes the delay motor 60.

Assuming now that the thermostat 32 calls for an opening of the ventilator before the ventilator 10 reaches its closed position. The switching of the thermostat 32 deenergizes the close relay coil 28 and energizes the delay motor 60 through the normally open contact 58 of the first switch means 36. However, the open relay 26 cannot be energized since the normally closed contact 40 of the first switch means 36 is open and is not energized until the cam 62 is rotated sufficiently to allow the first switch means 36 to switch to its normal position. This provides sufficient time for the drive motor 16 to stop, thereby dropping out the centrifugal switch 22.

Various changes and modifications may be made in the above-described controller without deviating from the spirit or scope of the invention. Various features of the invention are set forth in the accompanying claims.

What is claimed is:

1. In a controller for opening and closing a ventilator for a greenhouse wherein a capacitor start motor is connected so as to position the ventilator, said motor having a running winding and a starting winding which is connected in series with a centrifugal switch and wherein a reversing relay is coupled to the windings of the motor to cause the drive motor to drive in a direction to open the ventilator when an open-relay coil in the relay is energized and to cause the drive motor to drive in a direction to close the ventilator when a close-relay coil in the relay is energized, a delay system to prevent alternating current from being supplied to the motor windings to reverse the same for a time period sufficient to allow the centrifugal switch to close, comprising a power supply, a delay motor geared down to provide a low rotational velocity on its output shaft, said delay motor having one side thereof coupled to one side of said power supply, each of said relay coils having one side connected to said one side of said power supply, a thermostat having a pair of contacts, a first of aid contacts being closed and a second of said contacts being opened by temperature rise and said first contact being opened and said second contact being closed by a temperature drop, one side of said first and one side of said second contact being coupled to the other side of said power supply, a first switch means having a normally open third contact and a normally closed fourth contact, one side of said third contact and one side of said fourth contact being coupled to the other side of said first contact, the other side of said third contact being coupled to the other side of said delay motor, the other side of said fourth contact being coupled to the other side of said open relay coil, a second switch means having a normally open fifth contact and a normally closed sixth contact, one side of said fifth contact and one side of said sixth contact being coupled to the other side of said second contact, the other side of said fifth contact being coupled to the other side of said delay motor, the other side of said sixth contact being coupled to the other side of said relay coil, and cam means connected to the output shaft of the delay motor for maintaining said first and second switch means in operated positions and sequentially switching said first and second switch means to their normal positions at least once for each revolution of said cam means.

2. Apparatus in accordance with claim 1 in which the thermostat includes a pair of fixed contacts and a movable contact, the movable contact being actuated by the temperature and each of said switch means includes a pair of fixed contacts and a movable contact, the movable contact being actuated by the cam means.

3. Apparatus in accordance with claim 2 in which the cam means includes at least one circular plate having a groove therein, and the movable contact of at least one of said fist and second switch means rides on said plate.